United States Patent
Liu

(10) Patent No.: US 10,776,612 B2
(45) Date of Patent: Sep. 15, 2020

(54) OBJECT HANDLING SYSTEM

(71) Applicant: Masterwork Automodules Tech Corp. Ltd, Taipei (TW)

(72) Inventor: Ming-Hsun Liu, Taipei (TW)

(73) Assignee: Masterwork Automodules Tech Corp. Ltd, Taipei (TW)

( * ) Notice: Subject to any disclaimer, the term of this patent is extended or adjusted under 35 U.S.C. 154(b) by 65 days.

(21) Appl. No.: 16/364,139

(22) Filed: Mar. 25, 2019

(65) Prior Publication Data
US 2020/0210683 A1 Jul. 2, 2020

(30) Foreign Application Priority Data

Dec. 26, 2018 (TW) .............................. 107147154 A

(51) Int. Cl.
  *G06K 9/00* (2006.01)
  *G06F 21/32* (2013.01)
  *G07C 9/37* (2020.01)

(52) U.S. Cl.
  CPC ......... *G06K 9/00288* (2013.01); *G06F 21/32* (2013.01); *G07C 9/37* (2020.01)

(58) Field of Classification Search
  CPC .................................. G07C 9/37; G06F 21/32
  See application file for complete search history.

(56) References Cited

FOREIGN PATENT DOCUMENTS

| CN | 107978069 | 5/2018 | |
|---|---|---|---|
| CN | 108564444 | 9/2018 | |
| CN | 207924737 | 9/2018 | |
| TW | M519294 | 3/2016 | |
| WO | WO-2017028118 A1 * | 2/2017 | ............. G07F 17/12 |

OTHER PUBLICATIONS

"Office Action of Taiwan Counterpart Application," dated Nov. 7, 2019, p. 1-p. 12.

* cited by examiner

*Primary Examiner* — King Y Poon
*Assistant Examiner* — Michael Burleson
(74) *Attorney, Agent, or Firm* — JCIPRNET

(57) ABSTRACT

An object handling system includes a facial recognition server, at least one order terminal, a controller, at least one image capturing device and an object access apparatus. The facial recognition server analyzes at least one first image captured by the at least one order terminal to generate at least one facial datum and identifies whether a specific facial datum is included in at least one second image captured by the at least one second image capturing device, wherein the at least one facial datum is linked to at least one object datum. The controller controls the object access apparatus to sense and determine whether at least one object recorded in a specific object datum is located in at least one specific accommodating space of the object access apparatus while the specific facial datum is identified.

20 Claims, 8 Drawing Sheets

OBJECT HANDLING SYSTEM

CROSS-REFERENCE TO RELATED APPLICATION

This application claims the priority benefit of Taiwan application serial no. 107147154, filed on Dec. 26, 2018. The entirety of the above-mentioned patent application is hereby incorporated by reference herein and made a part of this specification.

BACKGROUND OF THE INVENTION

1. Field of the Invention

The disclosure relates to an object handling system, and particularly relates to an object handling system integrating facial recognition and object guidance.

2. Description of Related Art

Currently, various apparatuses have been available to simplify the allocation of human labor for business transactions, so as to reduce the operation cost of shops for business owners and offer desirable shopping experiences for consumers. Point-of-sale (POS) systems can be implemented on the wall or a column-like object in the form of ticket booth or kiosk. Consumers can place an order by choosing relevant goods/services (e.g., meals, movies, etc.) via the ticket booth or the kiosk and pay for the purchases according to the information in the order. However, when the consumers pay for their purchases, the POS systems still require human labor to manually check whether the linkage between the orders and the consumers is correct.

Therefore, how to facilitate the performance of the automatized POS systems to reduce the human labor for business owners and facilitate the speed for the consumers to pick up goods, thereby offering more convenient services for business owners and consumers, has now become an issue to work on.

SUMMARY OF THE INVENTION

The disclosure provides an object handling system incorporating facial recognition, object guidance, and sensing of an accommodating space by an object access apparatus to effectively allow a flowing stream of users in obtaining desired objects at different time points by using a limited number of object access apparatuses (e.g., lockers), thereby reducing the human labor allocated at an object pickup site, facilitating an object pickup process, and reducing a pickup error rate of the users.

An object handling system according to an embodiment of the disclosure includes a facial recognition server, at least one order terminal, a controller, at least one second image capturing device, an object access apparatus, and at least one guide device. Each of the at least one order terminal includes a first image capturing device, an order device, a data transmission device, and a processor. The first image capturing device is configured to capture at least one first image. An order device is configured to obtain at least one object datum. A data transmission device communicates with the facial recognition server via a network. The processor captures the at least one first image through the first image capturing device and transmits the at least one first image to the facial recognition server through the data transmission device in response that a first user performs an order operation. The facial recognition server analyzes the at least one first image to generate at least one facial datum. The processor links the at least one facial datum and the at least one object datum with each other. The controller communicates with the facial recognition server via the network. The at least one second image capturing device is configured to capture at least one second image. The object access apparatus communicates with the controller. At least one accommodating space is provided inside the object access apparatus. The guide device is coupled to the controller. The controller transmits the at least one second image to the facial recognition server in response that the first user performs an object pickup operation. The facial recognition server identifies whether a specific facial datum is included in the at least one second image, and the specific facial datum is one of at least one facial datum. In a case where the specific facial datum is identified, the controller controls the object access apparatus corresponding to a specific object datum linked to the specific facial datum, senses and determines whether at least one object recorded in the specific object datum is located in at least one specific accommodating space of the object access apparatus. In addition, in a case where the at least one object is located in the at least one specific accommodating space, the at least one guide device indicates a location of the at least one specific accommodating space in which the at least one object is placed. The first user and a second user respectively perform the order operation or the object pickup operation in a simultaneous or time-divided manner.

An object handling system according to an embodiment of the disclosure includes a facial recognition server, at least one order terminal, a controller, at least one second image capturing device, an object access apparatus, and at least one locking apparatus. Each of the at least one order terminal includes a first image capturing device, an order device, a data transmission device, and a processor. The first image capturing device is configured to capture at least one first image. An order device is configured to obtain at least one object datum. A data transmission device communicates with the facial recognition server via a network. The processor captures the at least one first image through the first image capturing device and transmits the at least one first image to the facial recognition server through the data transmission device in response that a first user performs an order operation. The facial recognition server analyzes the at least one first image to generate at least one facial datum. The processor links the at least one facial datum and the at least one object datum with each other. The controller communicates with the facial recognition server via the network. The at least one second image capturing device is configured to capture at least one second image. The object access apparatus communicates with the controller. The at least one accommodating space is provided inside the object access apparatus. The at least one locking apparatus is configured to lock and unlock the at least one accommodating space. The controller transmits the at least one second image to the facial recognition server in response that the first user performs an object pickup operation. The facial recognition server identifies whether a specific facial datum is included in the at least one second image, and the specific facial datum is one of at least one facial datum. In a case where the specific facial datum is identified, the controller controls the object access apparatus corresponding to a specific object datum linked to the specific facial datum, senses and determines whether at least one object recorded in the specific object datum is located in at least one specific accommodating space of the object access apparatus. In addition, in a case where the at least one object is located in the at least one specific accommodating space, the at least one locking apparatus unlocks the at least one specific accommodating space in which the at least one object is placed. The first user and a second user respectively perform the order operation or the object pickup operation in a simultaneous or time-divided manner.

Based on the above, the embodiments of the disclosure are capable of capturing the facial feature datum of the user as the criterion of identification by using the facial recognition technology when the user performs the order operation with the order terminal, and linking the facial feature datum and the object datum with each other. After the user completes the order operation, the controller identifies the user in front of the image capturing device by using the image capturing device. The controller may further identify the user located in front of the image capturing device by using the image capturing device. After identifying the specific facial feature datum corresponding to the user, the object access apparatus corresponding to the object datum linked to the specific facial feature datum is obtained, and whether the object recorded in the specific object datum is located in the specific accommodating space of the object access apparatus is sensed and determined. In the case where the object is located in the specific accommodating space, the guide device indicates the location of the specific accommodating space in which the object is placed. In this way, the object handling system according to the embodiments of the disclosure may link the object datum and the facial feature datum of the consumer with each other and thereby verifies the consumer picking up the object without human labor. In addition with the sensing and determining on the accommodating space and the guidance of the guide device, the consumers can easily pick up objects from the object access apparatus. Thus, the flowing stream of users can obtain desired objects at different time points by using a limited number of the object access apparatuses, thereby reducing the human labor allocated at the object/goods pickup terminal/site, facilitating the object pickup process of the users, and reducing the pickup error rate of the users.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
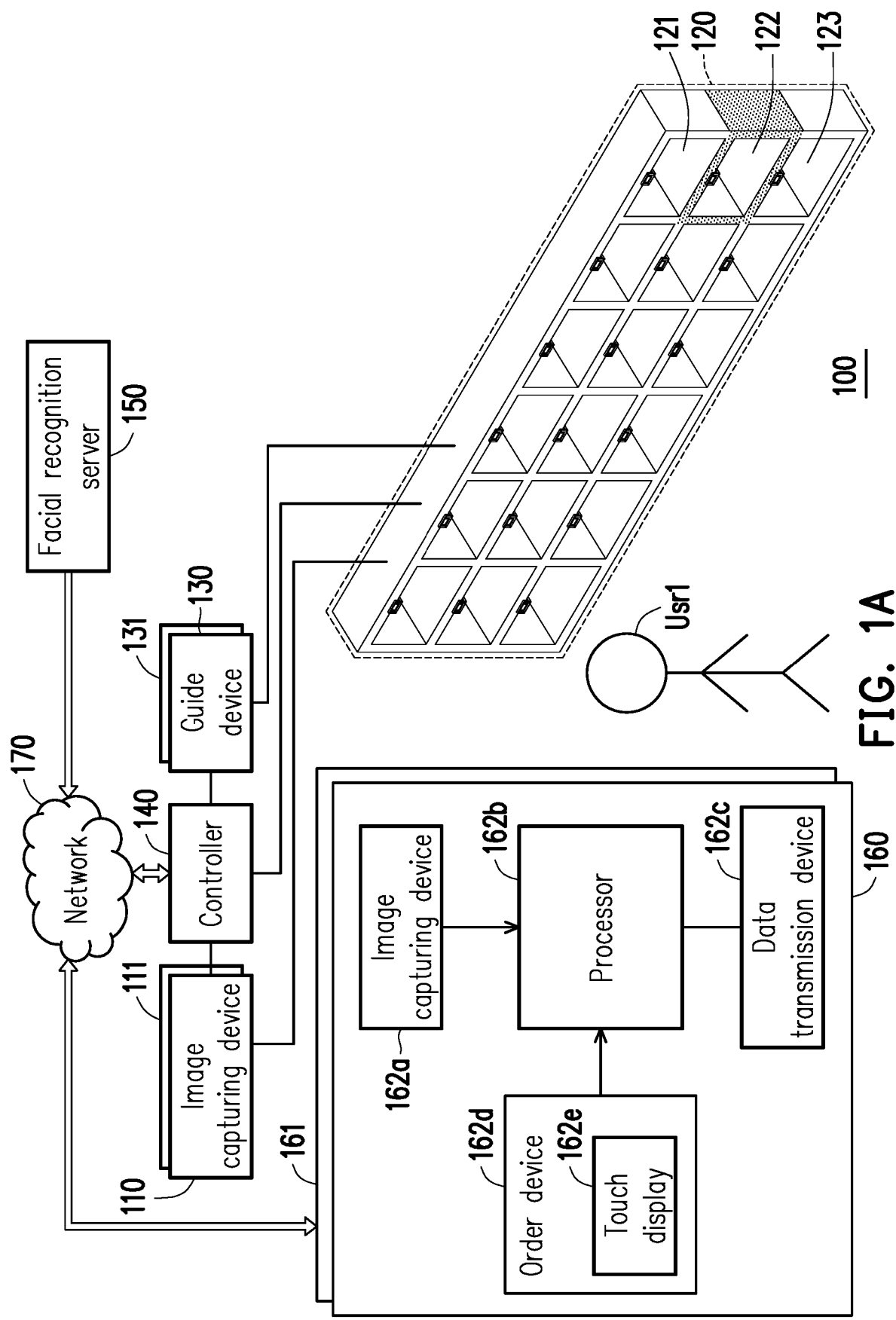
FIG. 1A is a schematic view illustrating an object handling system according to an embodiment of the disclosure.

Reference will now be made in detail to the present preferred embodiments of the invention, examples of which are illustrated in the accompanying drawings. Wherever possible, the same reference numbers are used in the drawings and the description to refer to the same or like parts.

The embodiments of the disclosure integrate facial recognition and object guidance to link object data and physiological features of consumers with each other, so that an electronic system is able to automatically and efficiently perform object guidance and pick operations with respect to object data corresponding to the consumers, thereby reducing the human labor of business owners, facilitating the flow and accuracy for the consumers to pick up the goods, and providing novel shopping experiences to the consumers. Relevant embodiments will be described in the following.

FIG. 1A is a schematic view illustrating an object handling system according to an embodiment of the disclosure. An object handling system 100 of the embodiment includes at least one image capturing device (e.g., image capturing devices 110 and 111), an object access apparatus 120, at least one guide device (e.g., guide devices 130 and 131), a controller 140, a facial recognition server 150, at least one order terminal (e.g., order terminals 160 and 161), and a network 170. The image capturing devices 110 and 111 serve to capture at least one first image. The controller 140 communicates with the image capturing devices 110 and 111, and the guide devices 130 and 131 are coupled to the controller 140. At least one accommodating space (e.g., 18 accommodating spaces including accommodating spaces 121, 122, 123, etc., as shown in FIG. 1A) is provided inside the object access apparatus 120. The controller 140 controls the image capturing devices 110 to 111, the object access apparatus 120, and the guide devices 130 and 131. The facial recognition server 150 serves to identify a facial datum in each image.

Each order terminal (i.e., the order terminal 160, 161) includes an image capturing device 162a, a processor 162b, a data transmission device 162c, and an order device 162d. In addition, each of the order terminals 161 and 162 may be realized as a multimedia kiosk. The image capturing device 162a is coupled to the processor 162b, and the order device 162d is coupled to the processor 162b. The data transmission device 162c is coupled to the processor 162b, so as to communicate with the facial recognition server 150 and the controller 140 via the network 170.

In the following, the operating relationships between the object handling system 100 and relevant parts of the embodiment will be described. The order device 162d of the embodiment includes a touch display 162e. The user (e.g., a user Usr1) may touch the touch display 162e to perform an order operation, so as to generate at least one object datum through the order operation. At the time when the user performs the order operation by using the order device 162d of one of the order terminals 160 and 161, the image capturing device 162a may capture at least one first image including the user Usr1 using one of the order terminals 160 and 161. Those applying the embodiment are not particularly limited in terms of how the image capturing device 162a captures the image of the user.

It should be noted that, when a first user (e.g., the user Usr1) performs the order operation by using the order terminal (e.g., the order terminal 160), another user (e.g., a second user) may simultaneously perform the order operation by using another idling order terminal (e.g., the order terminal 161). Or, when the user Usr1 completes the order operation by using the order terminal (e.g., the order terminal 160), the second user may perform the order operation by using another idling order terminal (e.g., the order terminal 161), or the second user may perform the order operation by keeping using the order terminal 160. In other words, with the at least one order terminal according to the embodiments of the disclosure, different users may perform the order operations in a simultaneous or time-divided manner, thereby facilitating the smoothness and convenience of the order operation.

After the image capturing device 162a in one of the order terminals 160 and 161 captures at least one first image, the processor 162b captures the at least one first image through the first image capturing device 162a and transmits the at least one first image to the facial recognition server 150 via the network 170 by using the data transmission device 162c. The facial recognition server 150 may analyze the at least one first image to generate at least one facial datum. The "facial datum" refers to a facial datum corresponding to the user (e.g., the user Usr1) analyzed/captured/identified from the first image. The facial datum is a datum formed by 128 or 256 facial feature points. Then, the facial recognition server 150 transmits the at least one facial datum back to the data transmission device 162c via the network 170, and the processor 162b links the at least one object datum and the at least one facial datum in the at least one first image with each other.

Meanwhile, after the user Usr1 completes the order operation by using one of the order terminals 160 and 161, when the user is to perform an object pickup operation, the controller 140 may capture the facial datum of the user Usr1 by using the image capturing devices 110, 111 to generate at least one second image, and the controller 140 may transmit the at least one second image to the facial recognition server 150 via the network 170. In addition, the facial recognition server 150 may analyze the at least one second image to identify whether at least one specific facial datum is included in the at least one second image. It should be noted that the specific facial datum is one of the at least one facial datum, and the at least one facial datum is linked to the at least one object datum.

In other words, the facial recognition server 150 of the embodiment is able to determine whether the facial datum identified from the at least one second image is one of the at least one facial datum identified from the at least one first image, and each facial datum has at least one object datum linked to the facial datum. If the facial datum identified from the at least one second image is one of the at least one facial datum, it is determined that the specific facial datum (i.e., the facial datum of the user Usr1) is included in the at least one second image. It should be noted that, for the ease of description, FIG. 1A only illustrates two image capturing devices 110 to 111, two guide devices 130 to 131, and two order terminals 160 to 161 as an exemplary embodiment. However, the disclosure does not intend to limit the types and numbers of the image capturing devices, the guide devices, and the order terminals. People having ordinary skills in the art may make adjustment based on practical needs. The image capturing devices 110 and 111 and the image capturing device 162 may be image capturing equipment such as cameras, video cameras, etc.

In the case where the specific facial datum (i.e., the facial datum of the user Usr1) is identified, the controller 140 may find a specific object datum linked to the facial datum of the user Usr1 through the specific facial datum, and control the object access apparatus 120 to sense at least one specific accommodating space (e.g., the accommodating space 122) in the object access apparatus 120, thereby determining whether at least one object recorded in the specific object datum is located in the at least one specific accommodating space (e.g., the accommodating space 122) of the object access apparatus 120.

It should be noted that, when the first user (e.g., the user Usr1) performs the object pickup operation (e.g., capturing an image by using the image capturing device 110), another user (e.g., the second user) may simultaneously capture an image by using another idling image capturing device (e.g., the image capturing device 111), so as to perform the object pickup operation. Besides, a third user may also perform the order operation. Alternatively, when the user Usr1 completes the object pickup operation by using the image capturing device 110, another user (e.g., the second user) may simultaneously capture an image by using another idling image capturing device (e.g., the image capturing device 111) to perform the object pickup operation, or the second user may perform the object pickup operation by keeping using the image capturing device 110. In other words, the at least one image capturing device according to the embodiments of the disclosure may be used in a simultaneous or time-divided manner to perform the object pickup operations by different users, thereby facilitating the smoothness and convenience of the object pickup operation. In addition, in the embodiments of the disclosure, the order operation and the object pickup operations of different users are independent from each other. That is, there is no sequential relationship between the order operation and the object pickup operation performed by the first user and the order operation and the object pickup operation performed by the second user.

It should be noted that, for the ease of description, FIG. 1A only shows 18 accommodating spaces in the object access apparatus 120 of the embodiment of the disclosure. However, the disclosure does not intend to limit the number of accommodating spaces in the object access apparatus 120. In addition, while the accommodating space 122 of the embodiment is described as an exemplary embodiment of the specific accommodating space, there may be two or more specific accommodating spaces in other embodiments of the disclosure. People having ordinary skills in the art may adjust the number of the specific accommodating spaces according to the number of objects that need to be placed in practical needs. Meanwhile, in the object access apparatus 120 in FIG. 1A of the embodiment of the disclosure, the configuration in each accommodating space is the same. However, the disclosure does not intend to limit the depth, height, and width of each accommodating space. People having ordinary skills in the art may make adjustment based on practical needs, and the illustration of FIG. 1A shall not be construed as a limitation on the disclosure.

Then, in the case where the controller 140 determines that at least one object is located in the specific accommodating space (i.e., the accommodating space 122) by using the object access apparatus 120, the controller 140 may control at least one guide device (i.e., the guide device 130, 131) to indicate the location of the accommodating space 122. It should be noted that, after the user Usr1 obtains the at least one object in the accommodating space 122 (i.e., the specific accommodating space), the controller 140 may remove the specific facial datum and the specific object datum linked to the specific facial datum, so as to facilitate the data processing speed and reduce the time for facial recognition afterwards.

In addition, in other embodiments of the disclosure, if the specific facial datum (i.e., the facial datum of the user Usr1) is not included in the at least one second image (i.e., the image of the user Usr1) captured by the image capturing devices 110, 111, the recognition of the facial recognition server 150 fails, and the controller 140 may capture the facial datum of the user Usr1 again by using the image capturing devices 110, 111. Specifically, when the facial recognition server 150 identifies that the specific facial datum is not included in the at least one second image, the facial recognition server 150 may notify the controller 140 via the network 170, and the controller 140 may determine whether the number of times of comparison in which the specific facial datum is not included in the second image is greater than or equal to a default value. When the number of times of comparison is not greater than or equal to the default value, the controller may add 1 to the value of the number of times, control the image capturing devices 110, 111 to capture the at least one second image again, and transmit the at least one second image to the facial recognition server 150 via the network 170 again, thereby determining again whether the specific facial datum is included in the at least one second image.

In this way, the object handling system 100 of the embodiment is capable of capturing the facial feature datum of the user as the criterion of identification by using the facial recognition technology when the user performs the order operation with the order terminal, and linking the facial feature datum and the order datum with each other. The facial recognition server may identify the user located in front of the image capturing device by using the facial datum, thereby reducing human labor allocated for confirming the identity of the user at the object pickup end. In addition, after the specific facial datum is identified, the specific object datum linked to the specific facial datum corresponding user can be found quickly. Also, when it is sensed and determined that the object recorded in the specific object datum is already placed in the specific accommodating space, the location of the specific accommodating space can be indicated to the user by using the guide device, thereby efficiently assisting a flowing stream of users in obtaining the desired objects at different time points by using a limited number of object access apparatuses, facilitating the speed for the users to obtain the objects, and ensuring that the users pick up the objects from the correct accommodating spaces, so as to reduce the pickup error rate of the users.

Figure 1B:
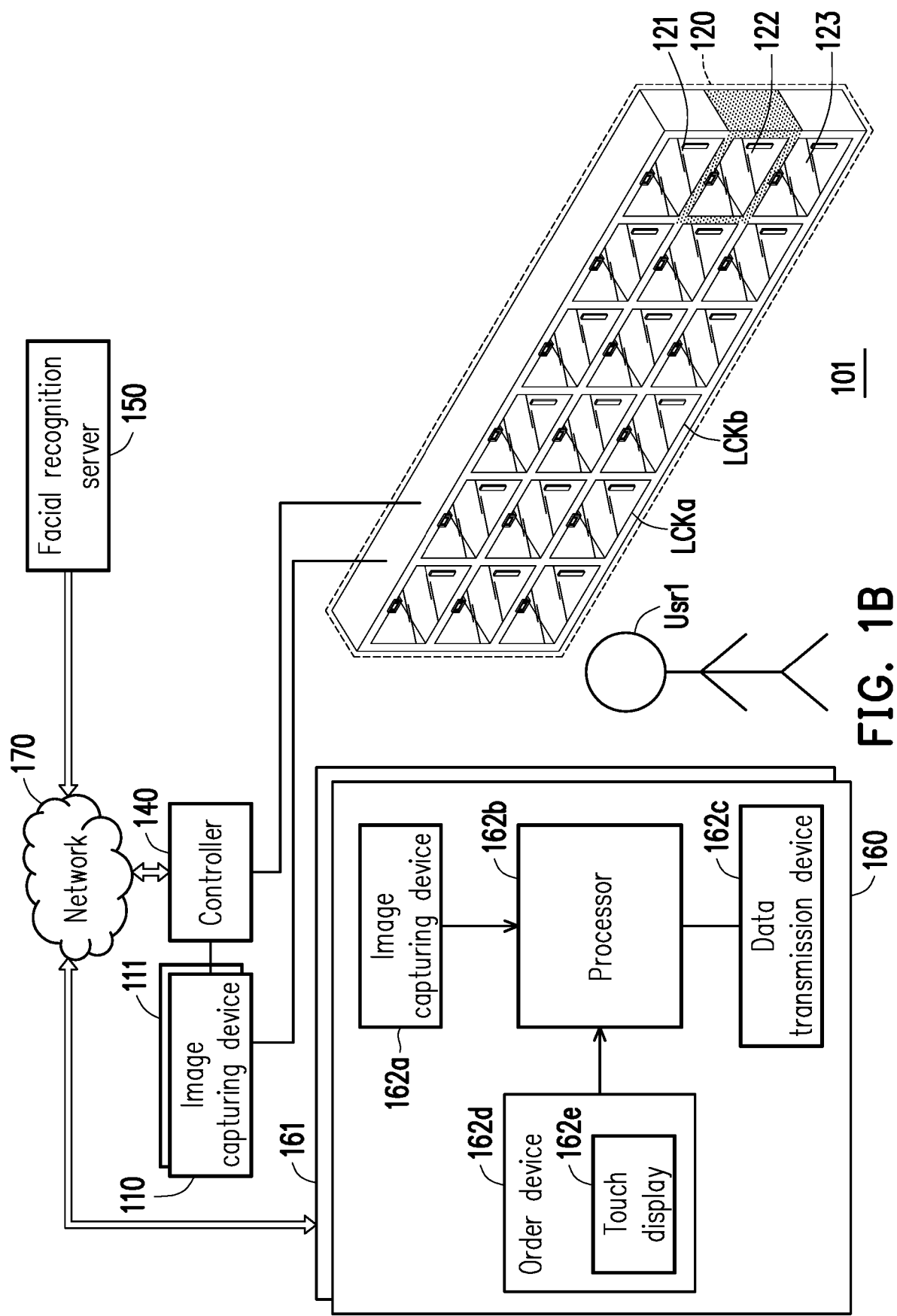
FIG. 1B is a schematic view illustrating an object handling system according to another embodiment of the disclosure.

Moreover, referring to FIG. 1B, FIG. 1B is a schematic view illustrating an object handling system according to another embodiment of the disclosure. In the embodiment, an object handling system 101 includes at least one image capturing device (e.g., the image capturing devices 110, 111), the object access apparatus 120, the controller 140, the facial recognition server 150, at least one order terminal (e.g., the order terminal 160, 161), at least one locking apparatus (e.g., the locking apparatuses Lcka, Lckb), and the network 170. What differs from the embodiment of FIG. 1A is that the object handling system 101 of the embodiment does not require a guide device, but uses a sound/audio effect/action when the locking apparatus performs unlocking to indicate the location of the specific accommodating space to the user.

Specifically, the image capturing devices 110, 111 serve to capture at least one first image. The controller 140 communicates with the image capturing devices 110, 111. At least one accommodating space (e.g., 18 accommodating spaces including the accommodating spaces 121, 122, 123, etc., as shown in FIG. 1B) is provided inside the object access apparatus 120. The controller 140 controls the image capturing devices 110 to 111, the object access apparatus 120, and the locking apparatuses Lcka to Lckb. The facial recognition server 150 serves to identify the facial datum in each image. The locking apparatuses Lcka to Lckb may lock the at least one accommodating space in the object access apparatus 120 in default to prevent the object in the accommodating space from falling. In the case where the controller 140 determines that at least one object is located in the at least one specific accommodating space, the controller 140 may control the locking apparatuses Lcka to Lckb to automatically unlock the at least one accommodating space.

In this way, when the user is to perform the object pickup operation, the user may be informed of the location of the specific accommodating space through the sound/audio effect/opening operation of the locking apparatus for unlocking when the locking apparatus perform an unlocking operation. In addition to reducing the cost for disposing the guide device, the embodiment also ensures that the user picks up the object from the correct accommodating space, thereby reducing the pickup error rate of the user. It should be noted that, for the ease of description, only the locking apparatuses Lcka and Lckb are described in the embodiment of the disclosure as an example. However, the 18 accommodating spaces in the embodiment of the disclosure are respectively provided with the corresponding locking apparatuses, and the illustration of FIG. 1B shall not be construed as a limitation on the disclosure.

Also, the configurations and operational relationships of the remaining devices and parts in the object handling system 101 of the embodiment (e.g., how the user performs the order operation and the object pickup operation) are similar to the object handling system 100 in the embodiment of FIG. 1A, and therefore will not be repeated in the following.

It should be noted that another example of the embodiment of FIG. 1B may include at least one guide device (e.g., at least one light emitting diode), and the at least one guide device may be respectively disposed in the at least one locking apparatus. In this way, when the locking apparatus locks the at least one accommodating space in default, each guide device corresponding to each accommodating space may emit light. For example, when each accommodating space is in a locked state, the corresponding light emitting diode may emit red light to show the locked state that is currently not openable. Comparatively, when each accommodating space is in an unlocked state, the corresponding light emitting diode may emit green light to indicate an unlocked state currently openable, so as to indicate the location of the specific accommodating space in which the at least one object is placed to the user. However, the disclosure does not intend to limit the colors of light emitted by the light emitting diode in correspondence with different states (i.e., the locked/unlocked states) of the accommodating space.

Figure 2:
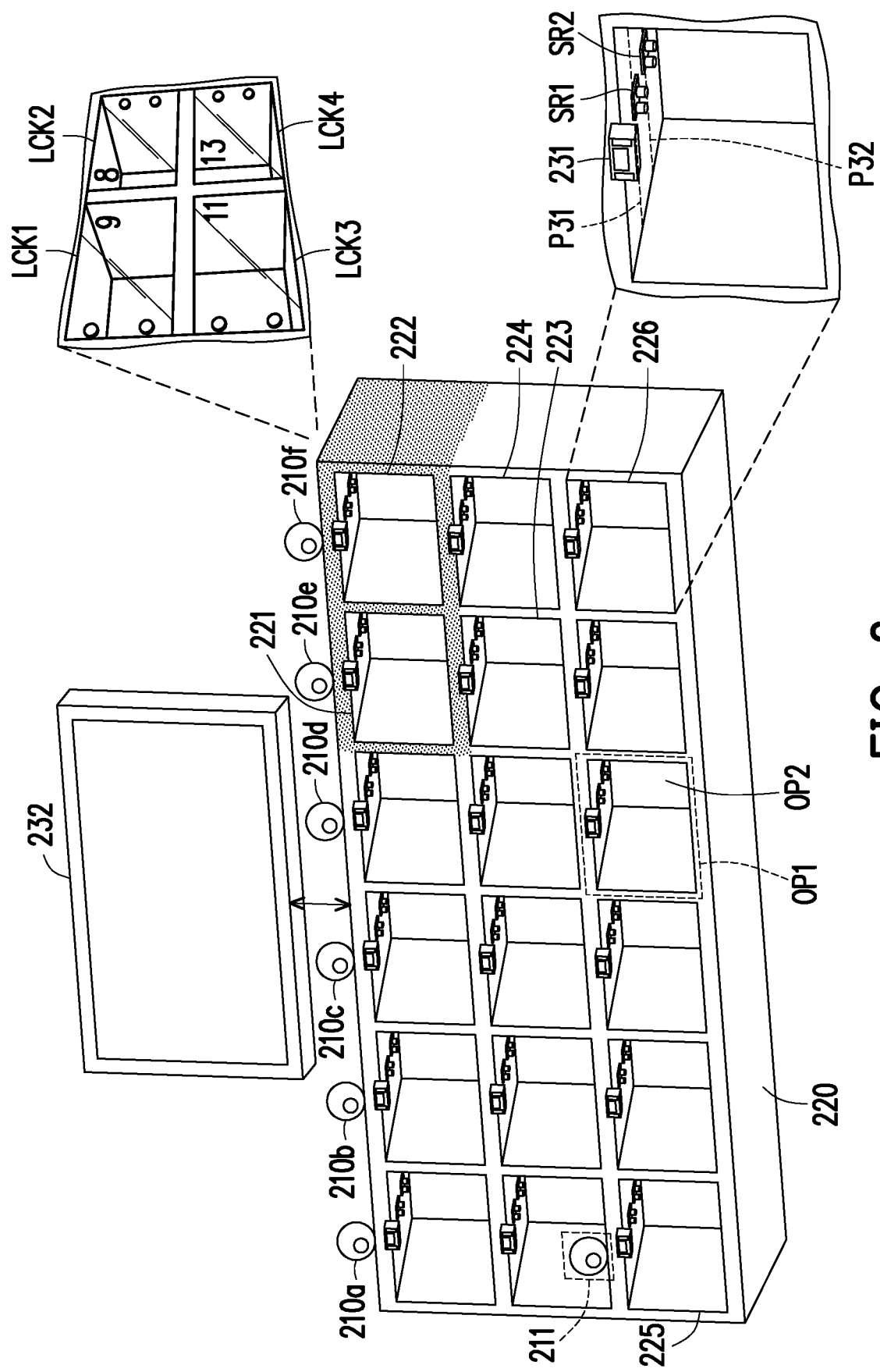
FIG. 2 is a schematic view illustrating another example of the object handling system of the embodiment of FIG. 1A.

Then, referring to FIGS. 1A and 2, FIG. 2 is a schematic view illustrating another example of the object handling system of the embodiment of FIG. 1A. As shown in an object access apparatus 220 of FIG. 2, each accommodating space (e.g., accommodating spaces 221 to 225) of the object access apparatus 220 has a first access opening (e.g., an access opening OP1) and a second access opening (e.g., an access opening OP2), and the access opening OP1 and the access opening OP2 are respectively located on opposite sides of each accommodating space. In addition, the access opening OP1 is an access opening in the direction facing toward the user (e.g., the user Usr1), and the access opening OP2 is an access opening in the direction facing toward the staff.

In the embodiment, the object access apparatus 220 includes at least one sensing apparatus. The at least one sensing apparatus is disposed in each of the at least one accommodating space to sense each accommodating space and thereby generate at least one sensing result. Specifically, taking the accommodating space 226 as an exemplary embodiment, the accommodating space 226 includes a sensing apparatus SR1 and a sensing apparatus SR2 for sensing whether at least one object is placed in the accommodating space 226 and thereby generating the sensing result. According to the sensing result, the controller (e.g., the controller 140 in FIG. 1A) determines whether at least one object is located in the accommodating space 226 of the object access apparatus 220.

It should be noted that the configuration in each accommodating space (e.g., 18 accommodating spaces including the accommodating spaces 221 to 225) in the object access apparatus 220 of the embodiment is similar to that of the accommodating space 226, so details in this regard will not be repeated in the following. It should be noted that, in the embodiment, the sensing apparatus SR1 is disposed at a location near the access opening OP1 of the accommodating space 226 to generate a first sensing result, and the sensing apparatus SR2 is disposed at a location near the access opening OP2 of the accommodating space 226 to generate a second sensing result. For example, the sensing apparatus SR1 may be disposed at a location around the first one-third portion (as indicated by a broken line P31) from the access opening OP1 in the accommodating space 226, and the sensing apparatus SR2 may be disposed at a location around the first one-third portion (as indicated by a broken line P32) from the access opening OP2 in the accommodating space 226.

In this way, when at least one object is placed into (or picked up from) the accommodating space 226, the at least one object may be firstly sensed by one of the sensing apparatus SR1 and the sensing apparatus SR2, thereby generating the first sensing result, and then sensed by the other of the sensing apparatus SR1 and the sensing apparatus SR2, thereby generating the second sensing result. Hence, the controller (e.g., the controller 140 of FIG. 1A) may determine the placing direction and the pickup direction of the at least one object in the accommodating space 226 according to the sensing time difference between the first sensing result and the second sensing result.

For example, when at least one object is placed into the accommodating space 226 via the access opening OP2, the sensing apparatus SR1 may firstly sense the at least one object and generate the second sensing result. The second sensing result may, for example, record that the at least one object enters the range of the broken line P32. Then, the at least one object is sensed by the sensing apparatus SR1, and the first sensing result is generated. The first sensing result may, for example, record that the at least one object enters the range of the broken line P31. At this time, the controller may determine that the at least one object is placed into the accommodating space 226 via the access opening OP2 according to the sensing time difference between the first sensing result and the second sensing result.

When the at least one object is picked up via the access opening OP1 of the accommodating space 226, the sensing apparatus SR2 may firstly sense the at least one object and generate the second sensing result. The second sensing result may, for example, record that the at least one object leaves the range of the broken line P32. Then, the at least one object is sensed by the sensing apparatus SR1, and the first sensing result is generated. The first sensing result may, for example, record that the at least one object leaves the range of the broken line P31. At this time, the controller may determine that the at least one object is picked up from the accommodating space 226 via the access opening OP1 according to the sensing time difference between the first sensing result and the second sensing result. In addition, when the at least one object is picked up via the access opening OP2 of the accommodating space 226, and when the at least one object is placed into the accommodating space 226 via the access opening OP1, the sensing processes of the sensing apparatus SR1 and the sensing apparatus SR2 and the determining process of the controller are similar to the above and can be derived by analogy. Therefore, details in this regard will not be repeated in the following. The sensing apparatus SR1 and the sensing apparatus SR2 may be various types of sensors such as ultrasonic sensors, thermal sensors, cameras, etc., and the disclosure does not intend to impose a limitation on this regard.

For example, when the object handling system 100 of the embodiment is applied in a scenario of restaurant, since each accommodating space of the object access apparatus 220 accommodates warm/hot food, ultrasonic sensors or thermal sensors may be adopted to sense whether the at least one object (food object in the embodiment) recorded in the specific object datum is located in the specific accommodating space. When the object handling system 100 of the embodiment is applied in a scenario of hospital, pharmacy, etc., since each accommodating space of the object access apparatus 220 accommodates medical products that is not warm or hot, in addition to sensing with ultrasonic sensors or thermal sensors, apparatuses such as cameras may be adopted to capture the image inside each accommodating space, so as sense whether the at least one object (medical products in the embodiment) is located in the specific accommodating space. In other words, the object handling system 100 according to the embodiments of the disclosure may adopt different sensing apparatuses in correspondence with different scenarios in which the system is applied, and the disclosure does not intend to impose a particular limitation on the type of sensing apparatuses.

In addition, it may also be that only one sensing apparatus is disposed in each accommodating space of the object access apparatus 220 for determining whether at least one object is placed in each accommodating space. In other words, the disclosure does not intend to limit the number of the sensing apparatus in each accommodating space.

Meanwhile, the object access apparatus 220 further includes at least one locking apparatus (e.g., locking apparatuses LCK1 to LCK4) for locking and unlocking the first access opening and the second access opening of each accommodating space. Specifically, the accommodating spaces 221 to 224 are described herein as an exemplary embodiment. As shown in the enlarged schematic view of the accommodating spaces 221 to 224 in the upper right corner of FIG. 2, the first access openings and the second access openings of the accommodating spaces 221 to 224 are provided with the locking apparatuses LCK1 to LCK4 for respectively locking and unlocking the access openings OP1 of the accommodating spaces 221 to 224. In addition, the locking apparatuses LCK1 to LCK4 lock the access openings OP1 of the accommodating spaces 221 to 224 in default to prevent the objects in the accommodating spaces from falling through the access openings OP1 and prevent the user from obtaining the objects in the accommodating spaces through the access openings OP1 at will. The locking apparatuses LCK1 to LCK3 may also lock/unlock the access openings OP2 of the accommodating spaces 221 to 224, and also lock the access openings OP2 of the accommodating spaces 221 to 224 in default to prevent the objects in the accommodating spaces from falling through the access openings OP2 and prevent the backstage staff from placing an object in an incorrect accommodating space. In this way, in the embodiments of the disclosure, by locking the accommodating spaces in default, the first access openings (or the second access openings) of the respective accommodating spaces can be prevented from being opened in an undesired situation which leads to pickup errors or misplacements.

In the case where the object access apparatus 220 determines that at least one object is located in the at least one specific accommodating space, at least one locking apparatus unlocks the first access opening of the at least one specific accommodating space. For example, after controlling the object access apparatus 220 to perform sensing, the controller determines that the at least one object which the user intends to pick up (i.e., the object recorded in the specific object datum linked to the facial datum of the user) is already placed in the at least one specific accommodating space (e.g., the accommodating spaces 221 and 222), the locking apparatuses may respectively unlock the access openings OP1 of the accommodating spaces 221 and 222 to allow the user to pick up the corresponding at least one object from the accommodating spaces 221 and 222.

Besides, in the embodiment, at least one image capturing device (e.g., image capturing devices 210a to 210f of FIG. 2) may be disposed above the object access apparatus 220 and capture images toward the front of the object access apparatus 220, so that facial recognition may be performed on the user from different positions and at different angles of the object access apparatus 220. Moreover, in other embodiments of the disclosure, the at least one image capturing device (e.g., the image capturing device 211 of FIG. 2) of the embodiment may also be disposed on each accommodating space (e.g., the accommodating space 225) of the object access apparatus 220, so that facial recognition may be performed on the user at different heights of the object access apparatus 220. In other words, the at least one image capturing device in the embodiments of the disclosure may be disposed above the object access apparatus 220 (i.e., the image capturing devices 210a to 210f) or disposed on the front (i.e., the image capturing device 211) of each accommodating space (i.e., the accommodating space 221) of the object access apparatus 220. That is, the disclosure does not intend to limit the position at which the at least one image capturing device is disposed. People having ordinary skills in the art may refer to the above descriptions and adjust the position at which the at least one image capturing device is disposed based on practical needs.

Besides, in the embodiment of the disclosure, the at least one guide device may include, for example, at least one display (i.e., a display 232), at least one light emitting diode (i.e., a light emitting diode 231), at least one indicator symbol (e.g., indicator symbols 8, 9, 11, and 13 on the accommodating spaces 221 to 224), or a combination thereof. In other words, the at least one guide device of the embodiment may also be, for example, a combination of the at least one display and the at least one light emitting diode, a combination of the at least one display and the at least one indicator symbol, a combination of the at least one light emitting diode and the at least one indicator symbol, or a combination of the at least one display, the at least one light emitting diode, and the at least one indicator symbol. The disclosure does not intend to impose a limitation on this regard.

Besides, in the embodiment, the at least one light emitting diode and the at least one indicator symbol are disposed on each accommodating space, for example, and the at least one display is displayed above the object access apparatus 220. Specifically, in the case where the at least one object is located in the at least one specific accommodating space (e.g., the accommodating space 221, 222), the at least one guide device may serve to indicate the location of the accommodating space 221, 222 in which the at least one object is already placed. For example, the controller may display a location datum of the accommodating space 221, 222 in which the at least one object is placed through a frame of the display 232. The location datum includes a coordinate datum (i.e., the column and row positions of the accommodating space 221, 222 in the object access apparatus 220) in the object access apparatus 220, or the indicator symbol corresponding to the accommodating space 221, 222 (i.e., the indicator symbol 8, 9). Besides, the controller may synchronously control the at least one light emitting diode on the at least one specific accommodating space (i.e., the light emitting diode on the accommodating space 221, 222) to emit light or glitter, so as to indicate the location of the accommodating space 221, 222 in which the at least one object is placed. It should also be noted that, in other embodiments of the disclosure, at least one light emitting diode may be arranged to form a shape of an indicator symbol (e.g., the indicator symbol 8, 9) and glitter or emit light. In other words, the disclosure does not intend to limit on how the at least one light emitting diode provides indication.

In this way, the object handling system according to the embodiments of the disclosure may display the location of the specific accommodating space on the display of the at least one guide device, so as to assist the user in quickly learning that the at least one object is already located in the specific accommodating space and guide the user to the specific accommodating space. At the same time of displaying the location of the specific accommodating space, the light emitting diode on the specific accommodating space may also emit light or glitter, so as to assist the user in confirming the location of the specific accommodating space, thereby facilitating the user's object pickup process by using the at least one guide device.

Figure 3A:
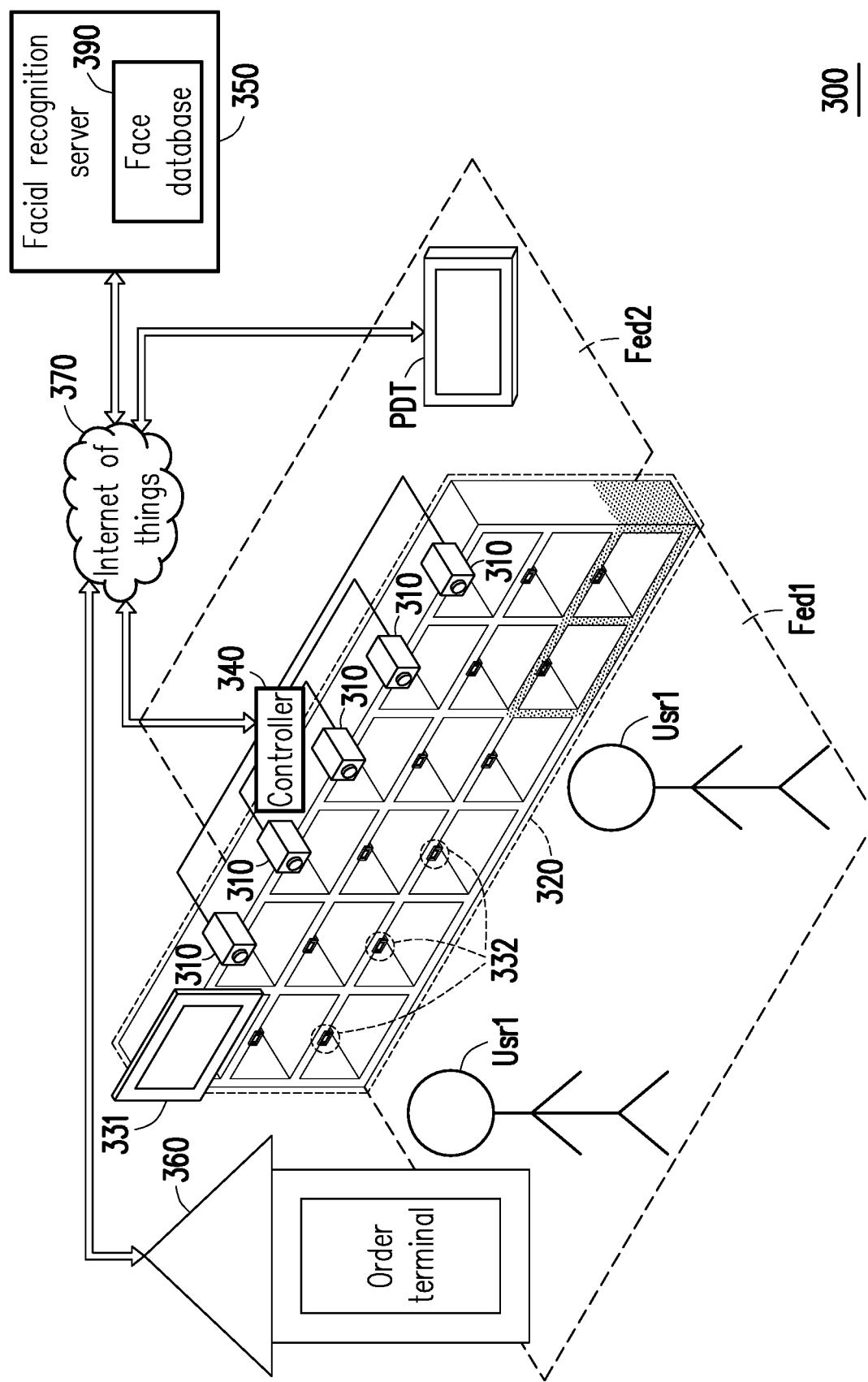
FIG. 3A is a schematic view illustrating an object handling system according to another embodiment of the disclosure.

Referring to FIG. 3A, FIG. 3A is a schematic view illustrating an object handling system according to another embodiment of the disclosure. What differs from the embodiment of FIG. 1A is that, an object handling system 300 of the embodiment includes at least one image capturing device (e.g., an image capturing device 310), an object access apparatus 320, at least one guide device (e.g., guide devices 331 and 332), a controller 340, a facial recognition server 350, at least one order terminal (e.g., an order terminal 360), a face database 390, and a storage display terminal PDT. The image capturing device 310 serves to capture the at least one first image. The controller 340 communicates with the image capturing device 310.

At least one accommodating space (e.g., 18 accommodating spaces shown in FIG. 3A) is provided inside the object access apparatus 320. The controller 340 controls each image capturing device 310, the object access apparatus 320, and the guide devices 330 to 332. The facial recognition server 350 serves to identify facial data in an image. The order terminal 360 serves to obtain the at least one object datum generated from the order operation performed by the user, and the order terminal 360 communicates with the facial recognition server 350, the face database 390, and the controller 340 through an internet of things (IoT) 370. It should be noted that the internal structure of the order terminal 360 is similar to the order terminals 160 to 161 in the embodiment of FIG. 1A. Therefore, details in this regard will not be repeated in the following. The storage display terminal PDT communicates with the facial recognition server 350, the face database 390, the order terminal 360, and the controller 340 via the IoT 370, so as to obtain the at least one object datum generated from the order operation carried out by the user from the order terminal 360, and displays at least one object that needs to be placed into the at least one accommodating space according to the at least one object datum.

It should be noted that the IoT 370 of this embodiment is a communication technology within the range of a specific area. The IoT 370 may be a bottom layer of a network system for connecting electronic apparatuses, such as Bluetooth, local area network (LAN), controller area network bus (CANBUS), recommended standard 232 (RS232) transmission interface, recommended standard 485 (RS485) transmission interface, etc., or an internet of things of any form. The disclosure does not intend to impose a limitation on this regard.

The facial recognition server 350 of this embodiment mainly adopts a biological feature datum (i.e., facial datum) of the user Usr1 as a criterion for determining the user. However, the facial recognition server 350 may also adopt an explicit feature datum associated with the user Usr1 as a supplementary datum for identifying the user. The explicit feature datum includes, for example, the color of clothes, glasses, ornaments, etc., of the user Usr1. In other words, the facial recognition server 350 further analyzes the at least one first image to obtain the explicit feature datum associated with the user Usr1, and the facial recognition server 350 links the at least one facial datum, the explicit feature datum, and the at least one object datum with one another and stores the data to the face database 390, so as to more accurately identify the user.

It should be noted that the face database 390 of the embodiment is configured in the facial recognition server 350 and serves to store the at least one facial datum and the at least one object datum linked to the at least one facial datum. Accordingly, the facial recognition server 350 may perform facial recognition according to the at least one facial datum and the at least one object datum in the face database 390. That is, in the embodiment, the controller 340, the facial recognition server 350, the face database 390, the order terminal 360, and the storage display terminal PDT communicate with each other via the IoT 370 (i.e., the controller 340, the facial recognition server 350, the face database 390, the order terminal 360, and the storage display terminal PDT are within an internal network of a shop/restaurant/hospital). In this way, since the controller 340, the facial recognition server 350, the face database 390, the order terminal 360, and the storage display terminal PDT all communicate via the IoT 370 in the internal network, the data transmission speed can be facilitated, so as to reduce the time required for operations such as recognizing a face, looking for a linked object datum, etc., and the private information of the user can be effectively protected.

Also, in other embodiments of the disclosure, the facial recognition server 350 and the face database 390 may also communicate with the parts in the IoT 370 via the Internet (i.e., the facial recognition server 350 and the face database 390 are in an external network of a shop/restaurant/hospital). At this time, the face database 390 may store a membership datum of the user (e.g., the user Usr1). The membership datum records information such as the purchase history in relevant shops/restaurants/hospitals, previously recorded facial datum, ordered goods/services, preference settings, etc., of the user. In addition to serving as a reference when the user performs the order operation to generate the object datum, so that the user can more easily establish the current object datum, the membership datum also allows the facial recognition server 350 to perform a cross-shop data search and facial recognition according to the previously recorded facial datum.

That is, in the embodiment, the controller 340, the order terminal 360, and the storage display terminal PDT communicate with the Internet via the IoT 370, thereby communicating with the facial recognition server 350 and the face database 390 via the Internet to perform a cross-shop facial recognition operation and a cross-shop data search operation, and thereby exchanging user (consumer) data among multiple shops/restaurants/hospitals. Based on the above, it is known that the disclosure does not impose a limitation on whether the facial recognition server 350 and the face database 390 are located in the internal network (i.e., the IoT) or the external network (i.e., the Internet) of multiple shops/restaurants/hospitals. People having ordinary skills in the art may make adjustment based on practical needs.

Figure 3B:
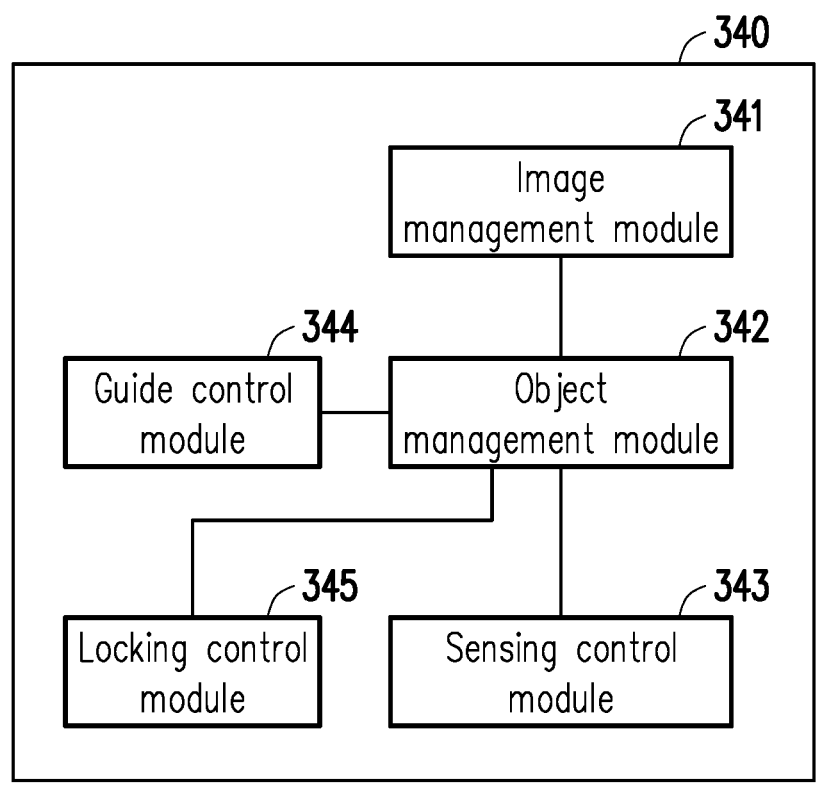
FIG. 3B is a schematic view illustrating internal apparatuses of a controller of the object handling system according to the embodiment of FIG. 3A.

Meanwhile, referring to FIGS. 3A and 3B, FIG. 3B is a schematic view illustrating internal apparatuses of a controller of the object handling system according to the embodiment of FIG. 3A. The controller 340 includes an image management module 341, an object management module 342, a sensing control module 343, a guide control module 344, and a locking control module 345. The object management module 342 is coupled to the image management module 341 and the guide control module 344. The sensing control module 343 is coupled to the object management module 342, and the locking control module 345 is coupled to the object management module 342. The image management module 341 communicates with the facial recognition server 350 via the IoT 370 to transmit the at least one second image and receive the specific facial datum. The object management module 342 serves to manage to which accommodating space of the object access apparatus 320 at least one object needs to be placed. In other words, the object management module 342 serves to receive and record the location of the specific accommodating space input by the staff. The sensing control module 343 serves to control the sensing apparatus in each accommodating space of the object access apparatus 320, so as to sense whether at least one object is placed in each accommodating space. The guide control module 344 serves to control at least one guide device (i.e., the guide device 331 and a plurality of guide devices 332). The locking control module 345 serves to control whether the locking apparatus (e.g., the locking apparatuses LCK1 to LCK4 in the embodiment of FIG. 2) in each accommodating space of the object access apparatus 320 locks or unlocks the first access opening and the second access opening of each accommodating space.

Figure 3C:
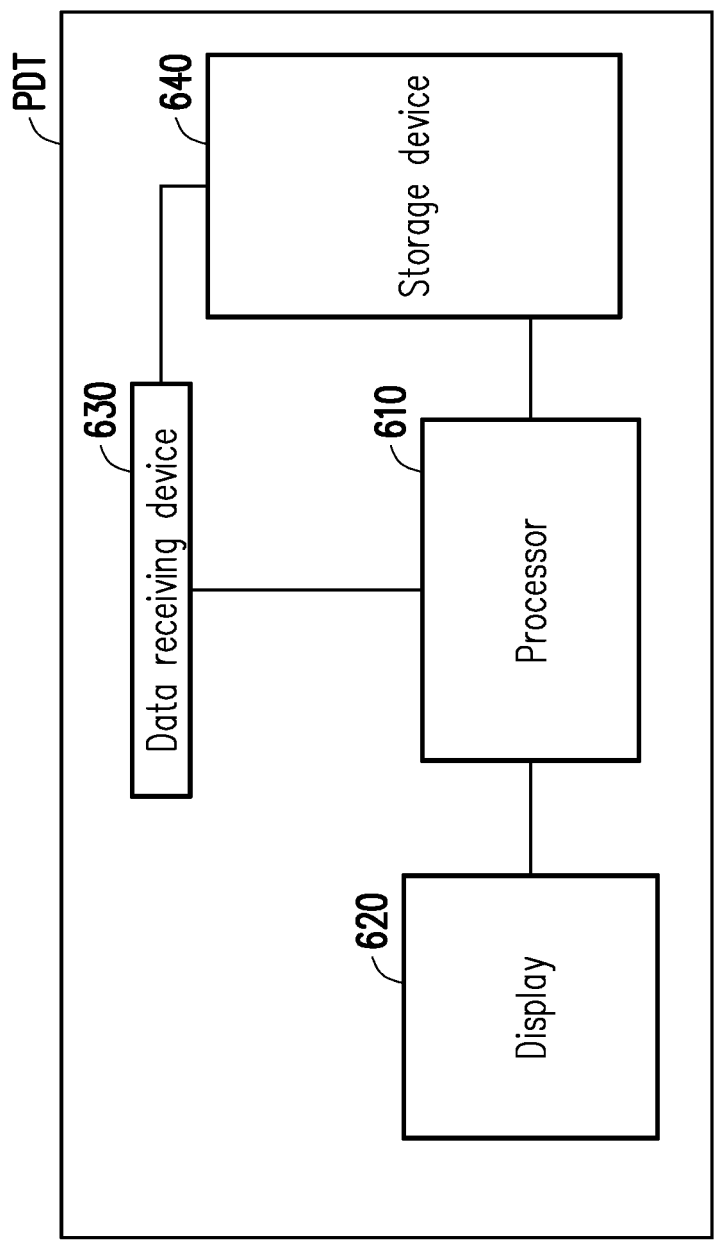
FIG. 3C is a schematic view illustrating internal apparatuses of a storage display terminal of the object handling system according to the embodiment of FIG. 3A.

Besides, referring to FIGS. 3A to 3C, FIG. 3C is a schematic view illustrating internal apparatuses of a storage display terminal of the object handling system according to the embodiment of FIG. 3A. The storage display terminal PDT mainly includes a data receiving device 630, a storage device 640, a display 620, and a processor 610. The storage device 640 is coupled to the data receiving device 630 and the processor 610, the display 620 is coupled to the processor 610, and the data receiving apparatus 630 is coupled to the processor 610. The data receiving device 630 communicates with the facial recognition server 350 via the IoT 370 to obtain at least one facial datum and at least one object datum linked to the at least one facial datum (including the specific facial datum and the specific object datum linked to the specific facial datum). The storage device 640 serves to store the at least one facial datum and the at least one object datum linked to the at least one facial datum obtained from the face database 390. It should be noted that the controller 340, the processor 610, and the processor (e.g., the processor 162b in the embodiment of FIG. 1A) inside the order terminal 360 may be a field programmable gate array (FPGA), an application specific integrated circuit (ASIC), or a digital signal processor (DSP).

In the following, the operational relationship between the object handling system 300 of the embodiment and relevant parts will be described. Referring to FIGS. 3A to 3C, in the embodiment, the user Usr1 at a front end Fed1 may perform the order operation by using the order device in the order terminal 360, so as to generate at least one object datum. Meanwhile, the processor in the order terminal 360 may control the image capturing device in the order terminal 360 to capture the at least one first image of the user Usr1. After the image capturing device in the order terminal 360 captures the at least one first image, the processor in the order terminal 360 may capture the at least one first image through the image capturing device and may transmit the at least one first image to the facial recognition server 350 via the IoT 370 by using a data transmission device. The facial recognition server 350 may analyze the at least one first image to generate the at least one facial datum, and transmit the at least one facial datum back to the order terminal 360 via the IoT 370. After the order terminal 360 receives the at least one facial datum, the processor in the order terminal 360 links the at least one facial datum and the at least one object datum with each other, and communicates with the face database 390 via the IoT 370 by using the data transmission device, so as to store the at least one facial datum and the at least one object datum linked to the facial datum to the face database 390.

Then, the storage display terminal PDT may obtain the at least one object datum linked to the at least one facial datum from the order terminal 360 via the IoT 370, and display at least one object according to the at least one object datum. At this time, the staff at a backstage Fed2 may correspondingly prepare the at least one object recorded in the at least one object datum according to what is displayed on the storage display terminal PDT, and place the at least one object into the at least one accommodating space (e.g., the accommodating space 321, 322) of the object access apparatus 320 after the preparation is completed, so that the at least one accommodating space (i.e., the accommodating space 321, 322) in which the at least one object is placed as the at least one specific accommodating space. After the placing operation is completed, the staff may input the location datum of the at least one specific accommodating space (i.e., the accommodating space 321, 322) to the object management module 342 in the controller 340. The location datum may be, for example, the coordinate datum of each specific accommodating space (i.e., the column and row positions of each specific accommodating space in the object access apparatus 320) or the indicator symbol (e.g., the indicator symbol in the embodiment of FIG. 2) corresponding to each specific accommodating space.

Besides, when the user Usr1 completes the order operation through the order terminal 360 and the staff already places the at least one object into the specific accommodating space, the object management module 341 in the controller 340 may receive the coordinate datum of each specific accommodating space from the storage display terminal PDT via the IoT 370. In addition, the guide control module 344 may control the guide device 331 (e.g., the display in the embodiment of FIG. 2), so that the guide device 331 displays the column and row positions of the accommodating space 321, 322 recorded in the coordinate datum. For example, the accommodating space 321 is located at the third row and the fifth column from the left, and the accommodating space 322 is located at the third row and the sixth column from the left. Meanwhile, with the guide device 332 disposed on the accommodating space 321, 322, the user Usr1 at the front end Fed 1 learns that the at least one object is prepared and placed in the accommodating space 321, 322 (i.e., the specific accommodating space).

The user Usr1 may then proceed to one of the image capturing devices 310 to perform the object pickup operation. When the user Usr1 approaches the image capturing device 310, the image management module 341 in the controller 340 may control the image capturing device 310 to capture the facial datum of the user Usr1 and generate the at least one second image. The image management module 341 in the controller 340 may transmit the at least one second image to the facial recognition server 350 via the network 170 and the IoT 370. The facial recognition server 350 analyzes the at least one second image to determine whether the facial datum identified from the at least one second image is one of the at least one facial datum. If the facial datum identified from the at least one second image is one of the at least one facial datum, the facial recognition server 350 determines that the specific facial datum (i.e., the facial datum of the user Usr1) is included in the at least one second image and notify the image management module 341 in the controller 340.

Then, in the case where the specific facial datum (i.e., the facial datum of the user Usr1) is identified, the image management module 341 in the controller 340 may find the specific object datum linked to the facial datum of the user Usr1 from the face database 390 in the facial recognition server 350 via the IoT 370, and transmit the specific object datum to the object management module 342. The object management module 342 in the controller 340 may refer to the coordinate datum of the accommodating space 321, 322 (i.e., the specific accommodating space) and the specific object datum, and the sensing control module 343 may control the sensing apparatus in the accommodating space 321, 322 of the object access apparatus 320 to sense whether the at least one object recorded in the specific object datum is already located in the accommodating space 321, 322.

If the sensing control module 343 determines that the at least one object is already placed in the accommodating space 321, 322 according to at least one sensing result, the locking control module 345 may control the locking apparatuses of the accommodating space 321, 322 to unlock the first access opening (i.e., the access opening facing toward the front end Fed1) of the accommodating space 321, 322, and the guide control module 344 controls the guide device 332 (e.g., the at least one light emitting diode in the embodiment of FIG. 2) on each accommodating space 321, 322 to emit light/highlight/glitter, so as to indicate the location of the accommodating space 321, 322 to the user Usr1. It should be noted that the image management module 341 of the controller 340 may set a valid time of the specific facial datum and determine whether the specific facial datum has expired according to the valid time. Accordingly, after the user completes the object pickup operation (i.e., obtaining the at least one object from the specific accommodating space), the facial recognition server 350 may determine the specific facial datum as expired, and remove the specific facial datum of the user Usr1 and the specific object datum linked to the specific facial datum, so as to reduce unnecessary data and the time for facial recognition afterwards.

It should be noted that, in other embodiments of the disclosure, the image capturing devices 310 may be integrated into the guide device 331 (i.e., the display). For example, the image capturing devices 310 and the guide device 331 may be realized as, for example, a tablet computer having a lens (e.g., a liquid crystal display apparatus with the iOS application program operating interface and/or the Android application program operating interface). That is, in other embodiments of the disclosure, the guide device 331 may be a tablet computer having a lens, and may serve to capture the at least one second image of the user Usr1 and display a guide operation, so as to indicate the location of the specific accommodating space to the user Usr1. Besides, the communication and control between the tablet computer having the image capturing devices 310 and the guide device 331 and the controller 340 may be realized by a transmission cable or the IoT 370. It should be noted that the disclosure does not intend to impose a limitation on this regard.

Also, the at least one locking apparatus in the object access apparatus 320 is also disposed at the first access opening and the second access opening of each accommodating space, and each locking apparatus locks the first access opening and the second access opening of each accommodating space in default. When the storage display terminal PDT displays the at least one object that needs to be placed into the specific accommodating space, each locking apparatus may unlock the second access opening (i.e., the access opening facing toward the backstage Fed2) of each specific accommodating space, so that the staff at the backstage Fed2 may place the at least one object into the at least one specific accommodating space. In this way, by locking the access opening of each accommodating space facing toward the backstage Fed2 in default and unlocking the access opening of each accommodating space only when the at least one object needs to be placed, the situation in which the staff places the at least one object into an incorrect accommodating space other than the at least one specific accommodating space when placing the at least one object can be effectively prevented.

Besides, the object access apparatus 320 is also capable of sensing a misplacement. Specifically, in an embodiment in which each accommodating space has no locking apparatus or the issue that the locking apparatus of each accommodating space is damaged arises, when the storage display terminal PDT displays the at least one object that needs to be placed into the at least one specific accommodating space, the storage display terminal PDT may present a state indicating that the at least one object is misplaced through displaying if the object access apparatus 320 senses and determines that at least one accommodating space other than each at least one specific accommodating space has one of the at least one object.

In other words, when the staff at the backstage Fed2 places one of the at least one object into an incorrect accommodating space (i.e., the accommodating space other than the at least one specific accommodating space), since the staff does not set in the object management module 342 of the controller 340 that an object needs to be placed into the accommodating space other than the at least one specific accommodating space, the controller 340 may control the object access apparatus 320 to sense the accommodating space other than the at least one specific accommodating space. When it is determined that the accommodating space other than the at least one specific accommodating space has an object, it is indicated that the staff misplaces at least one object, and the controller 340 may notify the storage display terminal PDT so that the storage display terminal PDT may display the error. In this way, when the object is incorrectly placed in the incorrect accommodating space, with the error display operation of the storage display terminal PDT, the staff can be informed of the misplacement in real time and take actions timely, thereby effectively reducing the misplacement of objects.

Figure 4:
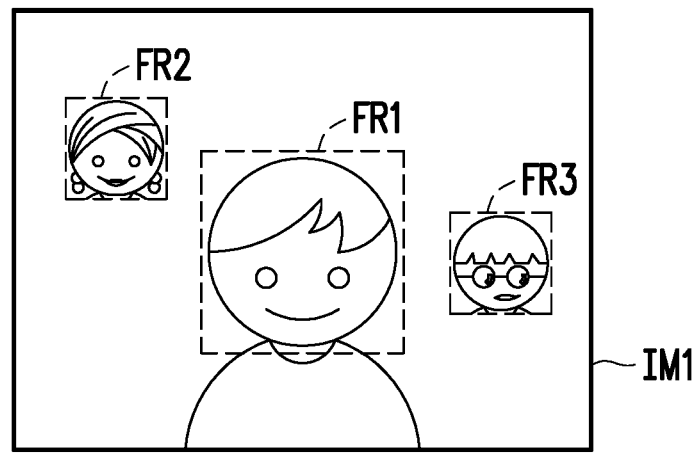
FIG. 4 is a schematic view illustrating a first image captured by an order terminal.

FIG. 4 is a schematic view illustrating a first image IM1 captured by the order terminal 360. Referring to FIG. 4, when receiving the first image IM1 captured by the order terminal 360, if the facial recognition server 350 of FIG. 3A finds that there are a plurality of facial images (e.g., facial images FR1, FR2, and FR3 in FIG. 4) available for the facial datum analysis, in order to reduce the amount of data and have a higher resolution of the facial datum of the user (e.g., the user Usr1), the facial recognition server 350 may adopt the facial image with the greatest area (e.g., the facial image FR1 in the first image IM1) as the basis for generation of the facial datum. Since the facial image FR1 occupies a larger area of the first image IM1, relevant features of the face can be analyzed more accurately. In some embodiments, assuming that the user (i.e., the user Usr1) using the order terminal 360 should gaze at the order terminal 360 for a long period of time, the facial recognition server 350 may also analyze whether the gazing directions of the facial images FR1, FR2, and FR3 are toward the order terminal 360, thereby determining the facial image FR1 having the gazing direction toward the order terminal 360 and occupying the greatest area as the basis for generation of the facial datum.

Figure 5:
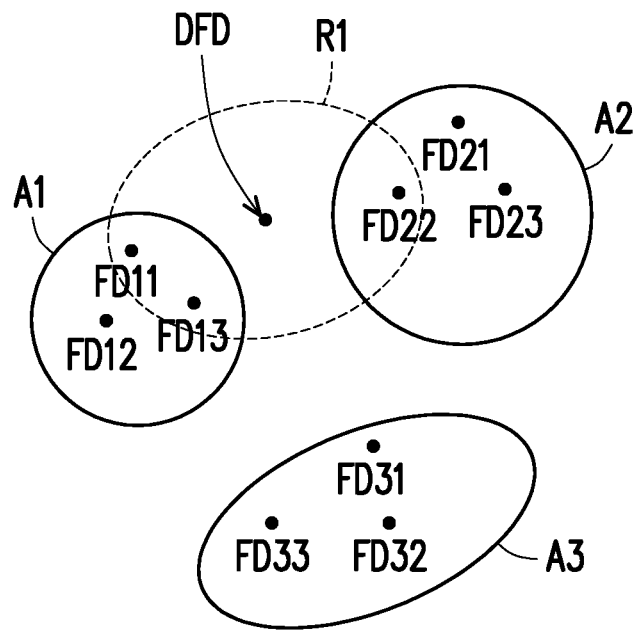
FIG. 5 is a schematic view illustrating clustering of a plurality of facial data according to a data clustering algorithm.

To facilitate the facial recognition efficiency of the facial recognition server 350, the facial recognition server 350 of the embodiment may perform clustering on a plurality of facial data of respective users obtained at different time points or from different angle in advance according to a data clustering algorithm, and determine the user to which the facial datum to be determined in the at least one first image IM1 belongs by using the clustered facial data, thereby facilitating the facial recognition efficiency of the facial recognition server 350. FIG. 5 is a schematic view illustrating clustering of a plurality of facial data according to a data clustering algorithm. Referring to FIGS. 3A and 5, the facial recognition server 350 may cluster a plurality of facial data into a plurality of facial datum groups according to the data clustering algorithm, and group facial data of the same user into the same facial datum group. Each facial datum group corresponds to a user. In other words, the plurality of facial data in the same facial datum group are the facial data of the corresponding user in a plurality of first images captured at different time points and/or from different capturing angles. For example, taking FIG. 5 as an example, facial data FD11, FD12, and FD13 of a facial datum group A1 all belong to a fourth user, facial data FD21, FD22, and FD23 in a facial datum group A2 all belong to a fifth user, and facial data FD31, FD32 and FD33 in a facial datum group A3 all belong to a sixth user. For subsequent facial recognition, the facial recognition server 350 may further generate and train datasets by using the facial data groups A1 to A3 according to the data clustering algorithm.

After the image capturing device 310 obtains the second image, the image management module 341 in the controller 340 may transmit the second image to the facial recognition server 350, and the facial recognition server 350 may analyze/identify the second image to obtain a facial datum DFD in the second image. In order to determine the user to which the facial datum DFD belongs, the facial recognition server 350 may adopt a data clustering algorithm (e.g., the k-nearest neighbors (KNN) algorithm) to find a plurality of similar facial data that are similar to the facial datum DFD and in the facial data from the data set. For example, the KNN algorithm adopts a process similar to spatial mapping to find a default number (e.g., 3) of similar facial data (e.g., facial data FD11, FD13, and FD22) in a region R1 similar to the facial datum DFD. Those applying the embodiment may adopt the value of the default number, such as 3, 5, 7, etc., based on needs, or adjust the size of the region R1 similar to the facial datum DFD. Then, the facial recognition server 350 may determine the user corresponding to the facial datum DFD according to the facial datum group into which the similar facial data FD11, FD13, and FD22 are clustered, so as to obtain the specific facial datum. In the case of FIG. 5, since the two similar facial data FD11 and FD13 are clustered into the facial datum group A1, and one single facial datum FD22 is clustered into the facial datum group A2, the facial datum DFD should be similar to the fourth user corresponding to the facial datum group A1. Therefore, the facial recognition server 350 may determine the facial datum DFD as the fourth user, thereby using the specific facial datum, the user number, or the specific object information linked to the user number corresponding to the fourth user for subsequent operations. With the above operation, the facial recognition efficiency of the facial recognition server 350 can be facilitated by using the KNN algorithm, and a search can be conducted with a trained data set without searching through the entire facial data.

It should be noted that, in the object handling system in the embodiment of FIG. 3A of the disclosure, the details of the operational relationships and the configurations of the image capturing device 310, the controller 340, the guide devices 331 to 332, and the object access apparatus 320 are similar to those in the embodiment of FIG. 1A and thus will not be repeated in the following.

Figure 6:
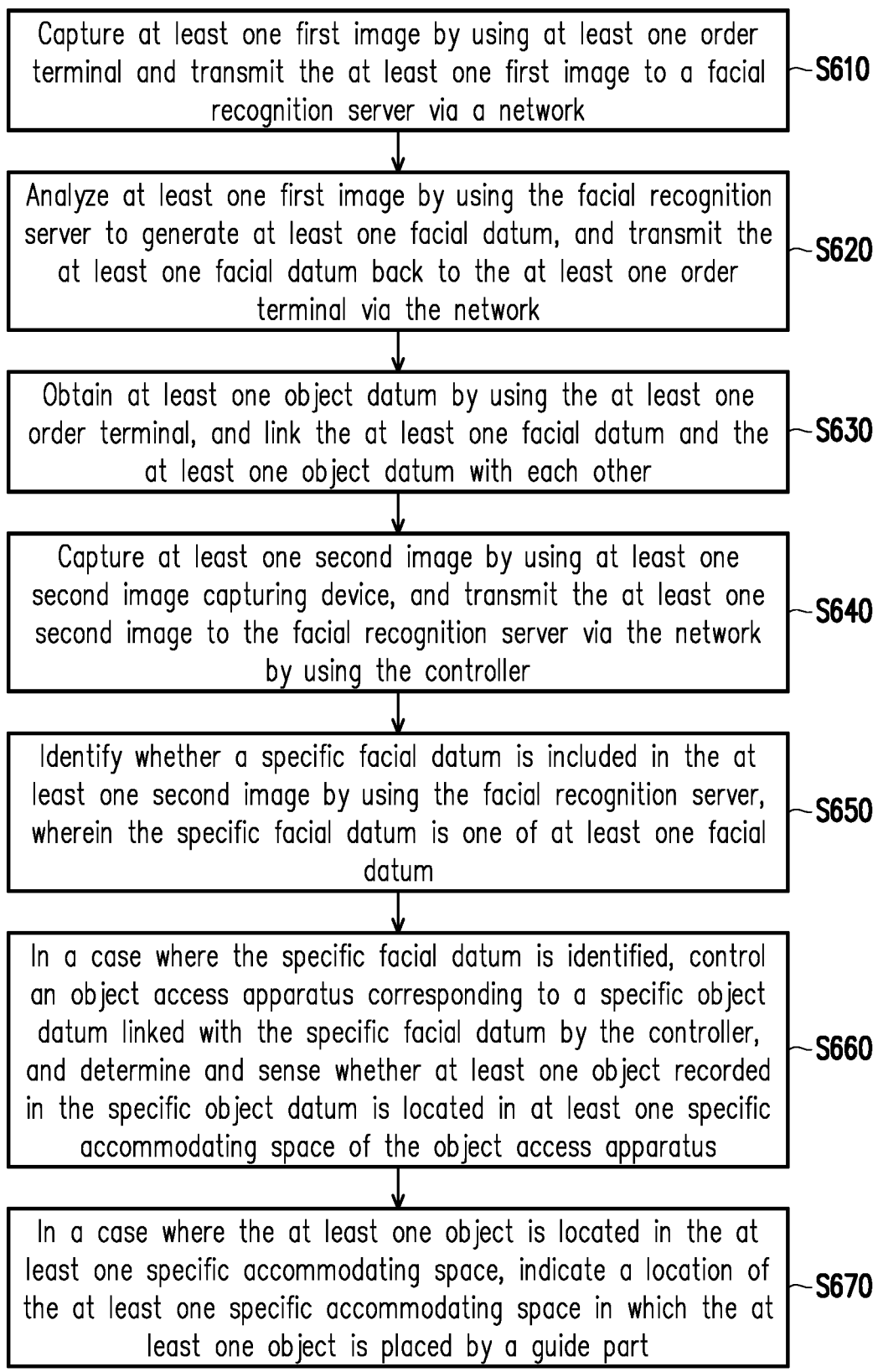
FIG. 6 is a flowchart illustrating an object handling method according to an embodiment of the disclosure.

Referring to FIG. 6, FIG. 6 is a flowchart illustrating an object handling method according to an embodiment of the disclosure. At Step S610, at least one first image is captured by using at least one order terminal, and the at least one first image is transmitted to a facial recognition server through a network. At Step S620, the at least one first image is analyzed by using the facial recognition server to generate at least one facial datum, and the at least one facial datum is transmitted back to the at least one order terminal via the network. At Step S630, at least one object datum is obtained by using the at least one order terminal, and the at least one facial datum and the at least one object datum are linked. Then, at Step S640, at least one second image is captured by at least one second image capturing device, and the at least one second image is transmitted to the facial recognition server via the network by using the controller. At Step S650, whether a specific facial datum is included in the at least one second image is identified by using the facial recognition server, and the specific facial datum is one of at least one facial datum. In the case where the specific facial datum is identified, an object access apparatus corresponding to the specific object datum linked to the specific facial datum is controlled by the controller, and whether at least one object recorded in the specific object datum is located in at least one specific accommodating space of the object access apparatus is sensed and determined (i.e., Step S660). Subsequently, in the case where the at least one object is located in the specific accommodating space, a location of the at least one specific accommodating space in which the at least one object is placed is indicated by at least one guide device (Step S670).

It should be noted that details for implementing Steps S610 to Step S670 are already described in the above embodiments and examples and therefore will not be repeated in the following.

In view of the foregoing, the embodiments of the disclosure are capable of capturing the facial feature datum of the user as the criterion for identification by using the facial recognition technology at the same time when the user performs the order operation with the order terminal, and linking the facial feature datum and the object datum. After the user completes the order operation, the controller identifies the user in front of the image capturing device by using the image capturing device. After identifying the specific facial feature datum corresponding to the user, the controller obtains the object access apparatus corresponding to the object datum linked to the specific facial feature datum and determines whether the object recorded in the specific object datum is located in the specific accommodating space of the object access apparatus. In the case where the object is located in the specific accommodating space, the guide device indicates the location of the specific accommodating space in which the object is placed. In this way, the object handling system according to the embodiments of the disclosure may link the object datum to the facial feature datum of the consumer, thereby verifying the consumer picking up the object, without human labor. Hence, the human labor allocated for verifying the identity of the consumer at the object/goods pickup terminal/site can be saved. Besides, the embodiments of the disclosure are capable of sensing the condition in the accommodating space and guiding the user by using the guide device, and are also capable of correctly guiding the user to the correct specific accommodating space in the object access apparatus, so as to pick up the object/goods. Thus, the embodiments of the disclosure are able to assist a flowing stream of users in obtaining the desired objects at different time points by using a limited number of object access apparatuses, facilitating the speed of the users' pickup processes, and reducing the pickup error rate of the users.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An object handling system, comprising:
   a facial recognition server;
   at least one order terminal, each of the at least one order terminal comprising:
   a first image capturing device, configured to capture at least one first image;
   an order device, configured to obtain at least one object datum;

a data transmission device, communicating with the facial recognition server via a network; and
a processor,
wherein the processor captures the at least one first image through the first image capturing device and transmits the at least one first image to the facial recognition server through the data transmission device in response that a first user performs an order operation, the facial recognition server analyzes the at least one first image to generate at least one facial datum, and the processor links the at least one facial datum and the at least one object datum with each other;
a controller, communicating with the facial recognition server via the network;
at least one second image capturing device, configured to capture at least one second image;
an object access apparatus, communicating with the controller, wherein at least one accommodating space is provided inside the object access apparatus; and
at least one guide device, coupled to the controller,
wherein the controller transmits the at least one second image to the facial recognition server in response that the first user performs an object pickup operation, the facial recognition server identifies whether a specific facial datum is included in the at least one second image, the specific facial datum being one of at least one facial datum,
in a case where the specific facial datum is identified, the controller controls the object access apparatus corresponding to a specific object datum linked to the specific facial datum, senses and determines whether at least one object recorded in the specific object datum is located in at least one specific accommodating space of the object access apparatus, and in a case where the at least one object is located in the at least one specific accommodating space, the at least one guide device indicates a location of the at least one specific accommodating space in which the at least one object is placed, and
wherein the first user and a second user respectively perform the order operation or the object pickup operation in a simultaneous or time-divided manner.

2. The object handling system as claimed in claim 1, further comprising:
a face database, configured in the facial recognition server, communicated with each of the at least one order terminal via the network, and configured to store the at least one facial datum and the at least one object datum.

3. The object handling system as claimed in claim 2, wherein the network comprises:
an internet of things; and
an Internet,
wherein each of the order terminal and the controller communicate with the facial recognition server and the face database via the internet of things or the Internet to access at least one facial datum and the at least one object datum in the face database.

4. The object handling system as claimed in claim 3, wherein the object access apparatus comprises:
at least one sensing apparatus, disposed in each of the at least one accommodating space and configured to sense each of the at least one accommodating space to generate at least one sensing result,
wherein the controller determines whether the at least one object is located in the at least one specific accommodating space of the object access apparatus according to the at least one sensing result.

5. The object handling system as claimed in claim 4, wherein each of the at least one accommodating space has a first access opening and a second access opening, and the first access opening and the second access opening are respectively located on opposite sides of each of the at least one accommodating space.

6. The object handling system as claimed in claim 5, wherein the object access apparatus further comprises:
at least one locking apparatus, configured to lock and unlock the first access opening and the second access opening.

7. The object handling system as claimed in claim 6, wherein the at least one locking apparatus locks the first access opening and the second access opening in default,
wherein in the case where the object access apparatus determines that the at least one object is located in the at least one specific accommodating space, the at least one locking apparatus unlocks the first access opening of the at least one specific accommodating space.

8. The object handling system as claimed in claim 7, further comprising:
a storage display terminal, located at a backstage of the object access apparatus, communicating with each of the order terminal and the face database via the internet of things, configured to obtain the at least one facial datum and the at least one object datum linked to the at least one facial datum from the face database, and displaying the at least one object that needs to be placed into the at least one accommodating space according to the at least one object datum.

9. The object handling system as claimed in claim 1, wherein the at least one guide device comprises at least one display, at least one light emitting diode, or a combination thereof.

10. The object handling system as claimed in claim 9, wherein the controller displays a location datum of the at least one specific accommodating space in which the at least one object is placed through a frame of the display, and the controller controls the at least one light emitting diode to emit light or glitter to indicate the location of the at least one specific accommodating space in which the at least one object is placed.

11. The object handling system as claimed in claim 1, wherein the at least one second image capturing device is disposed above the object access apparatus and faces toward a front end of the object access apparatus, or the at least one second image capturing device is disposed on each of the at least one accommodating space of the object access apparatus and faces toward the front end of the object access apparatus.

12. An object handling system, comprising:
a facial recognition server;
at least one order terminal, each of the at least one order terminal comprising:
a first image capturing device, configured to capture at least one first image;
an order device, configured to obtain at least one object datum;
a data transmission device, communicating with the facial recognition server via a network; and
a processor,
wherein the processor captures through the first image capturing device and transmits the at least one first image to the facial recognition server through the data transmission device in response that a first user performs an order operation, the facial recognition server analyzes the at least one first image to generate at least one facial datum, and the processor links the at least one facial datum and the at least one object datum with each other;
- a controller, communicating with the facial recognition server via the network;
- at least one second image capturing device, configured to capture at least one second image;
- an object access apparatus, communicating with the controller, wherein at least one accommodating space is provided inside the object access apparatus; and
- at least one locking apparatus, configured to lock and unlock the at least one accommodating space;
  wherein the controller transmits the at least one second image to the facial recognition server in response that the first user performs an object pickup operation, the facial recognition server identifies whether a specific facial datum is included in the at least one second image, the specific facial datum being one of at least one facial datum,
- in a case where the specific facial datum is identified, the controller controls the object access apparatus corresponding to a specific object datum linked to the specific facial datum, senses and determines whether at least one object recorded in the specific object datum is located in at least one specific accommodating space of the object access apparatus, and in a case where the at least one object is located in the at least one specific accommodating space, the at least one locking apparatus unlocks the at least one specific accommodating space in which the at least one object is placed, and
  wherein the first user and a second user respectively perform the order operation or the object pickup operation in a simultaneous or time-divided manner.

13. The object handling system as claimed in claim 12, further comprising:
    a face database, configured in the facial recognition server, communicating with each of the at least one order terminal via the network, and configured to store the at least one facial datum and the at least one object datum.

14. The object handling system as claimed in claim 13, wherein the network comprises:
    an internet of things; and
    an Internet,
    wherein each of the order terminal and the controller communicate with the facial recognition server and the face database via the internet of things or the Internet to access at least one facial datum and the at least one object datum in the face database.

15. The object handling system as claimed in claim 14, wherein the object access apparatus comprises:
    at least one sensing apparatus, disposed in each of the at least one accommodating space and configured to sense each of the at least one accommodating space to generate at least one sensing result,
    wherein the controller determines whether the at least one object is located in the at least one specific accommodating space of the object access apparatus according to the at least one sensing result.

16. The object handling system as claimed in claim 12, wherein each of the at least one accommodating space has a first access opening and a second access opening, and the first access opening and the second access opening are respectively located on opposite sides of each of the at least one accommodating space.

17. The object handling system as claimed in claim 16, wherein the at least one locking apparatus locks the first access opening and the second access opening in default,
    wherein in the case where the object access apparatus determines that the at least one object is located in the at least one specific accommodating space, the at least one locking apparatus unlocks the first access opening of the at least one specific accommodating space.

18. The object handling system as claimed in claim 12, wherein the object access apparatus further comprises:
    at least one guide device, configured to indicate a location of the at least one specific accommodating space in which the at least one object is placed.

19. The object handling system as claimed in claim 18, wherein the at least one guide device comprises at least one display, at least one light emitting diode, or a combination thereof, and the at least one guide device is disposed in the at least one locking apparatus.

20. The object handling system as claimed in claim 19, wherein the controller displays a location datum of the at least one specific accommodating space in which the at least one object is placed through a frame of the display, and the controller controls the at least one light emitting diode to emit light or glitter to indicate the location of the at least one specific accommodating space in which the at least one object is placed.

* * * * *